Aug. 9, 1932.  J. C. F. SELL  1,871,241
COUPLING MECHANISM
Filed Nov. 8, 1929  2 Sheets-Sheet 1

Witness:
William P. Kilroy

Inventor:
John C. F. Sell

Aug. 9, 1932.  J. C. F. SELL  1,871,241
COUPLING MECHANISM
Filed Nov. 8, 1929   2 Sheets-Sheet 2

Witness:
William P. Kilroy

Inventor:
John C. F. Sell
By Hill, Hill
Attys

Patented Aug. 9, 1932

1,871,241

UNITED STATES PATENT OFFICE

JOHN C. F. SELL, OF CHICAGO, ILLINOIS, ASSIGNOR TO EMMA OTILIE SELL, OF CHICAGO, ILLINOIS

COUPLING MECHANISM

Application filed November 8, 1929. Serial No. 405,649.

The invention relates to improvements in the construction of coupling mechanism for use in railroad rolling stock and an object of the invention is the improvement of coupling mechanism.

Still another object of the invention is the provision of improved automatic locking devices for such coupling mechanism.

Another object of the invention is the provision of coupling mechanism which is simple, compact, durable, reliable, efficient and satisfactory for its intended purpose.

Many other objects and advantages of the construction herein shown and described will be obvious to those skilled in the art from the disclosure herein given.

To this end my invention consists in the novel construction, arrangement and combination of parts herein shown and described, and more particularly pointed out in the claims.

In the drawings wherein like reference characters indicate like or corresponding parts:

Figure 1:
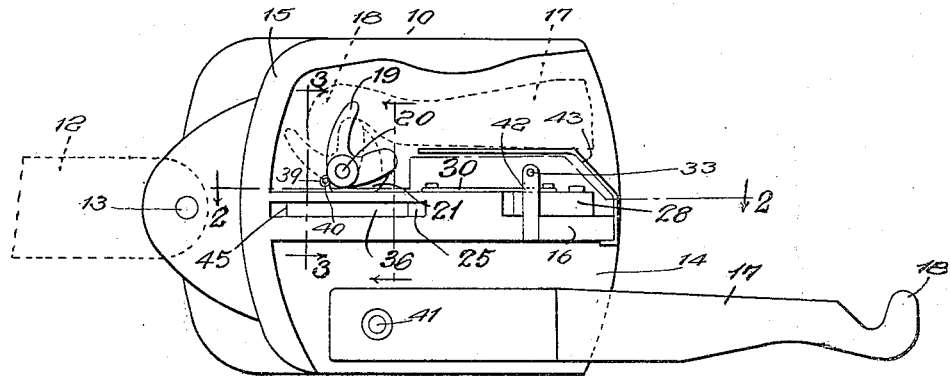
Fig. 1 is a top plan view of my preferred coupling construction with the cover removed.

Referring more particularly to Fig. 1, the coupling mechanism is generally designated by the numeral 10. The coupling mechanism is adapted to be connected in any desired manner to the frame work of a car body not shown.

A pin 13 is provided in the rear of the mechanism 10 in order that the device may be pivotally connected with a member 12 shown in dotted lines. The member 12 is not a portion of the device but illustrates a spring bar or any other device suitable for connecting the coupling mechanism with a car body.

The mechanism 10 comprises a hollow main body member 14 preferably constructed from malleable castings, or the like. The member 14 includes a cover 9 fastened by any suitable means such as screws (not shown). The bottom face of the member 14 is in sliding contact with the member 11 and has an upward projection 15 forming a side wall and a rear end wall. A longitudinally extending rib 16 divides the member 14 into two substantially equal parts. On one side of the rib 16 a tongue member 17 is connected with the member 14 by means of a pivot 41. On the other side of the rib 16 is positioned a knuckle 19 having a pivotal mounting 20. It is understood that each adjacent end of two cars to be coupled together is equipped with a coupling mechanism 10 carried by a supporting member 11 but as each device is of the same construction and operation, only one of such devices is shown. The mechanism mounted on the adjacent ends of any two cars being identical, when the two cars thus equipped are coupled together they are connected by two oppositely extending parallel tongue members 17, one on each side of the ribs 16.

Figure 4:
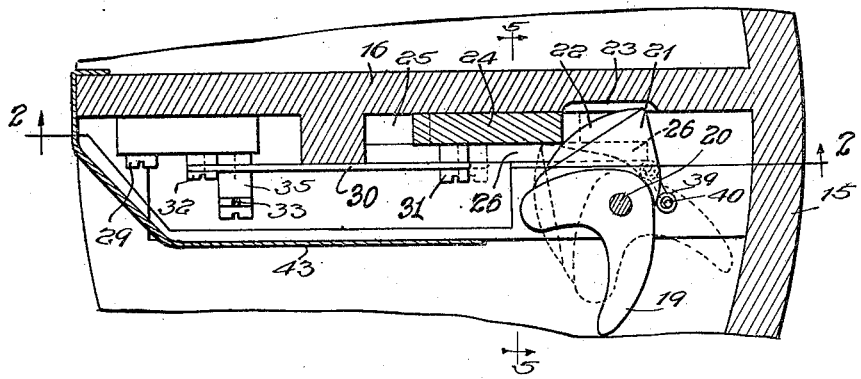
Fig. 4 is a section along the line 4—4 of Fig. 2.
Figure 5:
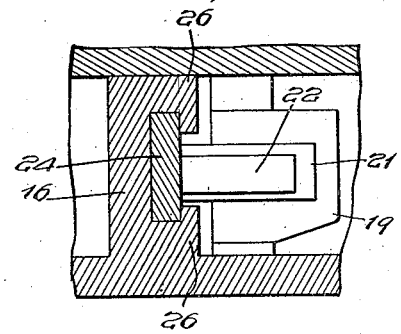
Fig. 5 is a section along the line 5—5 of Fig. 1 and of line 5—5 of Fig. 4.

The knuckle 19 takes the full line position shown in Figs. 1 and 4 when the car on which it is mounted is uncoupled. When two cars thus equipped are coupled together, the knuckles 19 on each device are moved to positions corresponding to the dotted lines of Fig. 1 by the inward movement of the hooks 18 on the ends of the tongue members 17.

Means is provided on each of the members 14 for locking the knuckle 19 in its dotted line position whereby the hooks 18 are held in operative engagement with the knuckles. The locking means includes an extension 21 on the knuckle 19, such extension having a projecting lip 22 which acts as a cam for slidably moving a plate or latch member 24 edgewise in a runway 25 as the knuckle is moved to its dotted line position. A pair of L-shaped projections 26, integrally formed with the rib 16, provide the runway 25 in which the latch member 24 is slidably mounted. The lower L-shaped projection or member 26 extends parallel to the rib 16 for a relatively short distance and terminates in a bar 44, spaced from the rib 16 and forming therewith an open pocket 45 connected with the runway 25.

Uncoupling of the cars equipped with the mechanism is accomplished by manually operated means comprising a rod 30 connecting the slide member 24 with a triangular plate 28. The rod 30 has a pivot connection 31 with the member 24 and a pivot connection 32 with the plate 28. The plate 28 is mounted on a pivot pin 29 so that the weight of the plate 28 normally acts through the rod 30 to force the member 24 toward the knuckle 19. A vertical pull rod 33 is utilized for manually moving the slide member 24 in the runway 25. The rod 33 has a ring 34 on its upper end providing a handle by means of which the switchman can manipulate the member 24, to release the knuckle 19 and thereby permit uncoupling by moving the cars apart.

The lower end of the rod 33 is connected with a pivot arm 35 which projects from the plate 28. An arm 42 mounted on the top of the rib 16 is apertured to provide a guide for the rod 33.

Figure 2:
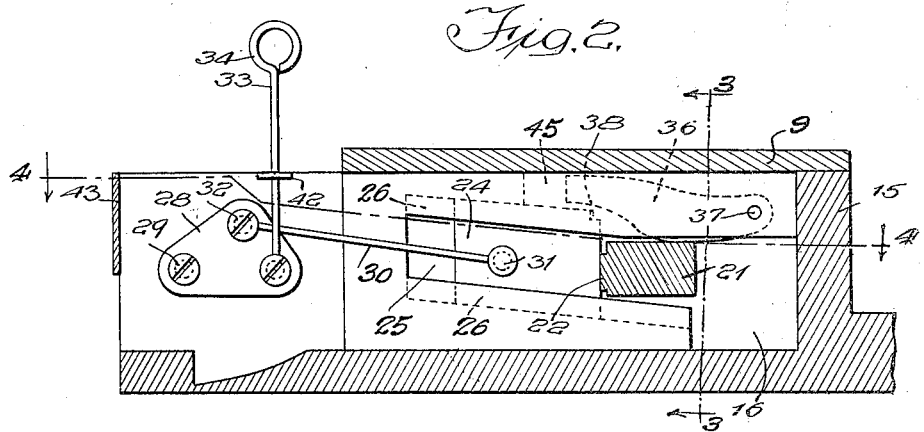
Fig. 2 is a section along the lines 2—2 of Figs. 1 and 4.
Figure 3:
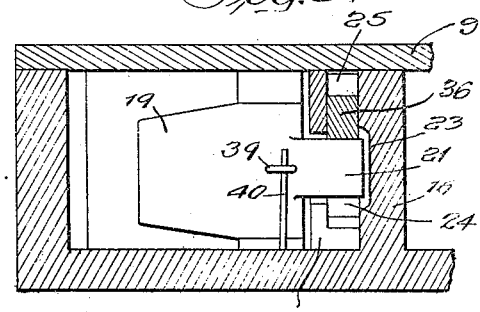
Fig. 3 is a section along the lines 3—3 of Figs. 1 and 2 drawn to a larger scale.

As observed in Fig. 2, it is obvious that the slide member 24 will be moved to the left by a pull on the rod 33. The movement of the knuckle 19 to its dotted line position forces the slide member 24 to the left as observed in Fig. 2 by reason of the cam action of the lip 22. This movement of the slide member 24 in the runway 25 actuates the rod 30 and causes the plate 28 to rotate about the pin 29. The runway 25 preferably slopes slightly downwardly toward the knuckle 19 and for this reason, the weight of the plate 28 tends to move the member 24 to the right upon release of the rod 33 and also when the knuckle is moved back to its full line position.

The extension 21 on the knuckle 19 is so constructed that it moves through a recess 23 in the side of the rib 16 as the knuckle is rotated. The movement of the knuckle 19 to its dotted line position rotates the extension 21 through the recess 23 to a point where it clears the slide member 24, whereupon the slide member 24 is permitted to move past the extension 21 until it is in the position indicated by the dotted lines of Fig. 4. In this position, it will be observed that the rear face of the extension 21 is adjacent the side of the slide member 24 so that any pull upon the knuckle 19 occasioned by draft on the tongue member 17 tends to pull the knuckle 19 back to its original full line position thereby bringing the extension 21 into contact with the side of the member 24, and locking the knuckle in engagement with the hook 18 on the end of the tongue member 17. The knuckle 19 is held in contact with the side of the member 24 by a spring member 40. The member 40 has one end fastened in the main body member 14 and its other end projects upwardly through an eyelet 39 formed in the adjacent face of the knuckle 19. The spring member 40 is so arranged as to constantly tend to rotate the knuckle 19 back to its full line position and thereby hold the extension 21 in contact with the side face of the member 24 when there is no pull on the tongue members 17.

The runway 25 is so arranged that when the plate 24 is in the lower end thereof with the knuckle 19 in its dotted line position corresponding to operative engagement with the entering hook 18, the rear face of the extension 21 is in holding engagement with the side of the plate as shown in dotted lines in Figs. 1 and 4. Since the plate 24 in its dotted line position does not permit the knuckle 19 to take the full line position of Figs. 1 and 4 it is necessary that means operating as a stop member be provided to limit the downward movement of the plate in its runway 25 in order that the knuckles 19 may normally stand in position to permit its engagement with an entering hook 18. The means providing a stop comprises a lever 36 normally positioned in the path of the plate member 24, when the knuckle is disengaged from its hook 18.

The lever 36, shown in dotted lines in Fig. 2, is mounted on a pivot 37 with its lower edge in contact with the upper face of the extension 21 so that the extension forms a support for the lever. The under face of the lever 36 is tapered upwardly so that the end of the lever normally clears the slide member 24 and permits the slide member to move back to a point where it locks the knuckle 19 in its dotted line position. Uncoupling or operative disengagement of the knuckle 19 from the hook 18 is accomplished by pulling up on the ring 34 until the slide member 24 is moved to a point where it clears the knuckle 19 and permits the knuckle to be returned to its full line position by the spring 40. In the full line position of the knuckle 19, the extension 21 is underneath the lever 36. The top surface of the extension 21 is lower than the top surface of the main body at the knuckle 19 and as a result, rotation of the knuckle to its full line position permits the lever 36 to drop to a position where the end of the lever lies in the path of the member 24 and enters a notch 38 in the upper right hand corner of the member 24. The end of the lever 36 upon entering the notch 38 serves as a stop limiting the movement of the member 24 to the right following the release of the knuckle from its locked position by manipulation of the rod 33.

A yielding guide plate 43 is mounted on the front end of the rib 16 in a position to guide the tongue member 17 as it enters the member 14 bringing the bar into proper position for operatively engaging the hook 18 with the knuckle 19.

Thus, it will be seen that I have provided a novel coupling mechanism and locking means therefor.

What I claim as new and desire to secure by Letters Patent is:

1. In coupling mechanism, a knuckle, a main body member upon which the knuckle is rotatably mounted, a longitudinally extending hollow vertical member providing an inclined runway alongside said knckle, a plate member slidably mounted in said runway and movable by gravity to the lower end thereof, means manually operable to move the plate member towards the upper end of the runway, said vertical member having a slot in its side wall adjacent the knuckle, said knuckle having an extension normally projecting through said slot into the path of said plate member in said runway, one side of said extension forming a cam surface normally engaging the lower end of the plate member, said extension being so positioned that rotation of the knuckle member in one direction moves said extension out of the path of said plate member and permits the plate member to move downwardly past said extension and thereby locks the knuckle against return movement.

2. In coupling mechanism, a knuckle, a main body member upon which the knuckle is rotatably mounted, means limiting the amount of rotation of the knuckle, a longitudinally extending hollow vertical member providing an inclined runway alongside said knuckle, a plate member slidably mounted in said runway and movable by gravity to the lower end thereof, means manually operable to move the plate member towards the upper end of the runway, said vertical member having a slot in its side wall adjacent the knuckle, said knuckle having an extension normally projecting through said slot into the path of said plate member in said runway, one side of said extension forming a cam surface normally engaging the lower end of the plate member, said extension terminating in a face transverse to the cam surface, said extension being so positioned that rotation of the knuckle member in one direction moves said extension out of the path of said plate member, and permits the plate member to move downwardly past said extension with its side face in proximity and substantially parallel to said transverse face of the extension, the plate member thereby locking the knuckle against return movement.

3. In coupling mechanism, a knuckle, a main body member upon which the knuckle is rotatably mounted, means limiting the amount of rotation of the knuckle, a hollow member providing an inclined runway alongside said knuckle, a plate member slidably mounted in said runway and movable by gravity to the lower end thereof, means manually operable to move the plate member towards the upper end of the runway, said hollow member having a slot in its side wall adjacent the knuckle, said knuckle having an extension projecting through said slot into the path of said plate member when the knuckle is at one end of its rotative path, one side of said extension forming a cam surface adapted to engage the lower end of the plate member, said extension terminating in a face transverse to the cam surface, said extension being so positioned that rotation of the knuckle member from the aforesaid position moves said extension out of the path of said plate member and permits the plate member to move by gravity alongside and adjacent to said transverse face of the extension thereby locking the knuckle against return movement, spring means tending to rotate said knuckle back to its initial position, a lever forming a stop limiting the movement of the plate downwardly in the runway, said knuckle and extension cooperating with said lever to move the lever out of the path of the plate member when the extension has been moved to said described locking position and to permit said lever to drop into a position where it provides a stop limiting the downward movement of the plate member upon return movement of the knuckle.

In witness whereof, I hereunto subscribe my name this 29th day of October, A. D. 1929.

JOHN C. F. SELL.